(12) United States Patent
Yoon et al.

(10) Patent No.: US 10,572,313 B2
(45) Date of Patent: Feb. 25, 2020

(54) CONTAINER-BASED DISTRIBUTED APPLICATION MANAGEMENT SYSTEM AND METHOD

(71) Applicant: SAMSUNG SDS CO., LTD., Seoul (KR)

(72) Inventors: Ho-Sang Yoon, Seoul (KR);
Moon-Hyuk Choi, Seoul (KR);
Hee-Chang Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 227 days.

(21) Appl. No.: 15/791,633

(22) Filed: Oct. 24, 2017

(65) Prior Publication Data
US 2018/0113750 A1    Apr. 26, 2018

(30) Foreign Application Priority Data

Oct. 24, 2016   (KR) .................. 10-2016-0138264

(51) Int. Cl.
*G06F 11/00*   (2006.01)
*G06F 9/50*    (2006.01)
*G06F 11/14*   (2006.01)

(52) U.S. Cl.
CPC .......... *G06F 9/5083* (2013.01); *G06F 9/5072* (2013.01); *G06F 9/5077* (2013.01); *G06F 11/142* (2013.01); *G06F 11/1425* (2013.01); *G06F 2201/805* (2013.01); *G06F 2201/82* (2013.01); *G06F 2209/505* (2013.01)

(58) Field of Classification Search
CPC ............. G06F 11/1402; G06F 11/1446; G06F 11/1448; G06F 11/1458; G06F 11/00
USPC .......................................................... 714/15
See application file for complete search history.

(56) References Cited

U.S. PATENT DOCUMENTS

| | | | | |
|---|---|---|---|---|
| 6,088,727 | A * | 7/2000 | Hosokawa | G06F 9/4856 709/223 |
| 6,987,076 | B1 * | 1/2006 | Jubb | C04B 28/24 501/35 |
| 9,800,466 | B1 * | 10/2017 | Rangole | H04L 41/5009 |
| 10,311,014 | B2 * | 6/2019 | Dalton | H04L 43/0876 |
| 10,455,019 | B2 * | 10/2019 | Barnes | H04L 67/1097 |
| 2007/0234293 | A1 * | 10/2007 | Noller | G06F 11/3688 717/124 |
| 2013/0124912 | A1 * | 5/2013 | Griffith | G06F 11/20 714/4.2 |
| 2017/0063679 | A1 * | 3/2017 | Olmsted-Thompson | H04L 45/64 |
| 2018/0027100 | A1 * | 1/2018 | Jeuk | H04L 67/34 370/469 |

(Continued)

*Primary Examiner* — Sarai E Butler
(74) *Attorney, Agent, or Firm* — Sughrue Mion, PLLC (57) ABSTRACT

A container-based distributed application management system includes a coordinator daemon configured to store and manage cluster setting information corresponding to a cluster formed by a plurality of distributed applications, the plurality of distributed applications configured to be separately executed in a plurality of containers; and a plurality of agent daemons configured to be separately installed and executed in the plurality of containers, and receive the cluster setting information from the coordinator daemon to execute at least one of the plurality of distributed applications installed in the plurality of containers, wherein the coordinator daemon and the plurality of agent daemons are implemented by using one or more hardware processors.

10 Claims, 8 Drawing Sheets

(56) References Cited

U.S. PATENT DOCUMENTS

2018/0048545 A1* 2/2018 Mishalov ............... H04L 41/08
2018/0109387 A1* 4/2018 Vyas .................... H04L 9/3247
2018/0349212 A1* 12/2018 Liu ......................... G06F 9/54

* cited by examiner

CONTAINER-BASED DISTRIBUTED APPLICATION MANAGEMENT SYSTEM AND METHOD

CROSS-REFERENCE TO RELATED APPLICATION

This application claims priority to and the benefit of Korean Patent Application No. 10-2016-0138264, filed on Oct. 24, 2016, the disclosure of which is incorporated herein by reference in its entirety.

BACKGROUND

1. Field

The present disclosure relates to a container-based distributed application management technology.

2. Discussion of Related Art

Recently, cases of applying the container technology to a distributed application, such as a distributed database, are increasing in number. Also, utilization of the orchestration technology for smoothly managing multiple containers in which distributed applications have been installed is increasing.

In a distributed environment, an orchestrator dynamically changes (scale-in/out) the number of containers in which distributed applications have been installed or, when a distributed application installed in a specific container is down due to an accident or a failure, senses the problem and runs a new container as a replacement for the down container. However, due to a structural characteristic of a container, the distributed application of the newly generated container does not have existing cluster information, and thus an administrator manually inputs the existing cluster information. Also, when a distributed application of a specific container is down, other nodes present in an existing cluster are not able to automatically sense the down node.

SUMMARY

The present disclosure is directed to providing a means for effectively managing a distributed application in a container-based distributed processing environment.

According to an aspect of an exemplary embodiment, there is provided a container-based distributed application management system, including: a coordinator daemon configured to store and manage cluster setting information corresponding to a cluster formed by a plurality of distributed applications, the plurality of distributed applications configured to be separately executed in a plurality of containers; and a plurality of agent daemons configured to be separately installed and executed in the plurality of containers, and receive the cluster setting information from the coordinator daemon to execute at least one of the plurality of distributed applications installed in the plurality of containers, wherein the coordinator daemon and the plurality of agent daemons are implemented by using one or more hardware processors.

The cluster setting information may include identification information of the at least one of the plurality of distributed applications included in the cluster.

An agent daemon among the plurality of agent daemons may be generated when a container corresponding to the agent daemon is newly generated.

The plurality of agent daemons may monitor whether a problem occurs in the at least one of the plurality of distributed applications and remove a distributed application in which an occurrence of the problem is detected from the cluster.

The plurality of agent daemons may query the coordinator daemon about whether the distributed application in which the occurrence of the problem is detected has been preempted and remove the distributed application from the cluster in response to a result of querying the coordinator daemon indicating that the distributed application has not been preempted.

The coordinator daemon may determine that the distributed application in which the occurrence of the problem has been detected has been preempted when a query about whether the distributed application has been preempted has been previously received from one of the plurality of agent daemons.

According to another aspect of an exemplary embodiment, there is provided a container-based distributed application management method, including: transmitting, by an agent daemon installed and executed in a newly generated container, a request for cluster setting information to a coordinator daemon; providing, by the coordinator daemon, the cluster setting information corresponding to a cluster formed by a plurality of distributed applications to the agent daemon, the plurality of distributed applications configured to be separately executed in a plurality of containers; and executing, by the agent daemon, a distributed application in the newly generated container based on the cluster setting information, wherein the agent daemon and the coordinator daemon are implemented by using one or more hardware processors.

The cluster setting information may include identification information of at least one of the plurality of distributed applications included in the cluster.

According to an aspect of another exemplary embodiment, there is provided a container-based distributed application management method, including: monitoring, by a plurality of agent daemons separately installed and executed in a plurality of containers, whether a problem occurs in at least one of a plurality of distributed applications that form a cluster, the plurality of distributed applications configured to be separately executed in the plurality of containers; querying, by an agent daemon that detects an occurrence of the problem in a distributed application among the plurality of distributed applications, a coordinator daemon about whether the distributed application in which the occurrence of the problem is detected has been preempted; and removing the distributed application from the cluster in response to a result of the querying indicating that the distributed application has not been preempted, wherein the plurality of agent daemons and the coordinator daemon are implemented by using one or more hardware processors The container-based distributed application management method may further include determining, by the coordinator daemon, that the distributed application in which the occurrence of the problem is detected has been preempted when a query about whether the distributed application has been preempted has been previously received from one of the plurality of agent daemons.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Hereinafter, exemplary embodiments of the present disclosure will be described in detail with reference to the accompanying drawings. The following description is provided to help comprehensive understanding of a method, apparatus, and/or system disclosed herein. However, it is merely exemplary, and the present disclosure is not limited thereto.

While describing the present disclosure, when it is determined that a detailed description of a known art related to the present disclosure may unnecessarily obscure the gist of the present disclosure, the detailed description will be omitted. Terms which will be described below are defined in consideration of functionality in the present disclosure, which may vary according to an intention of a user or an operator or a usual practice. Therefore, definitions thereof should be made on the basis of the overall content of this specification. Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," and "including," when used herein, specify the presence of stated features, numerals, steps, operations, elements, or combinations thereof, but do not preclude the presence or addition of one or more other features, numerals, steps, operations, elements, or combinations thereof.

Figure 1:
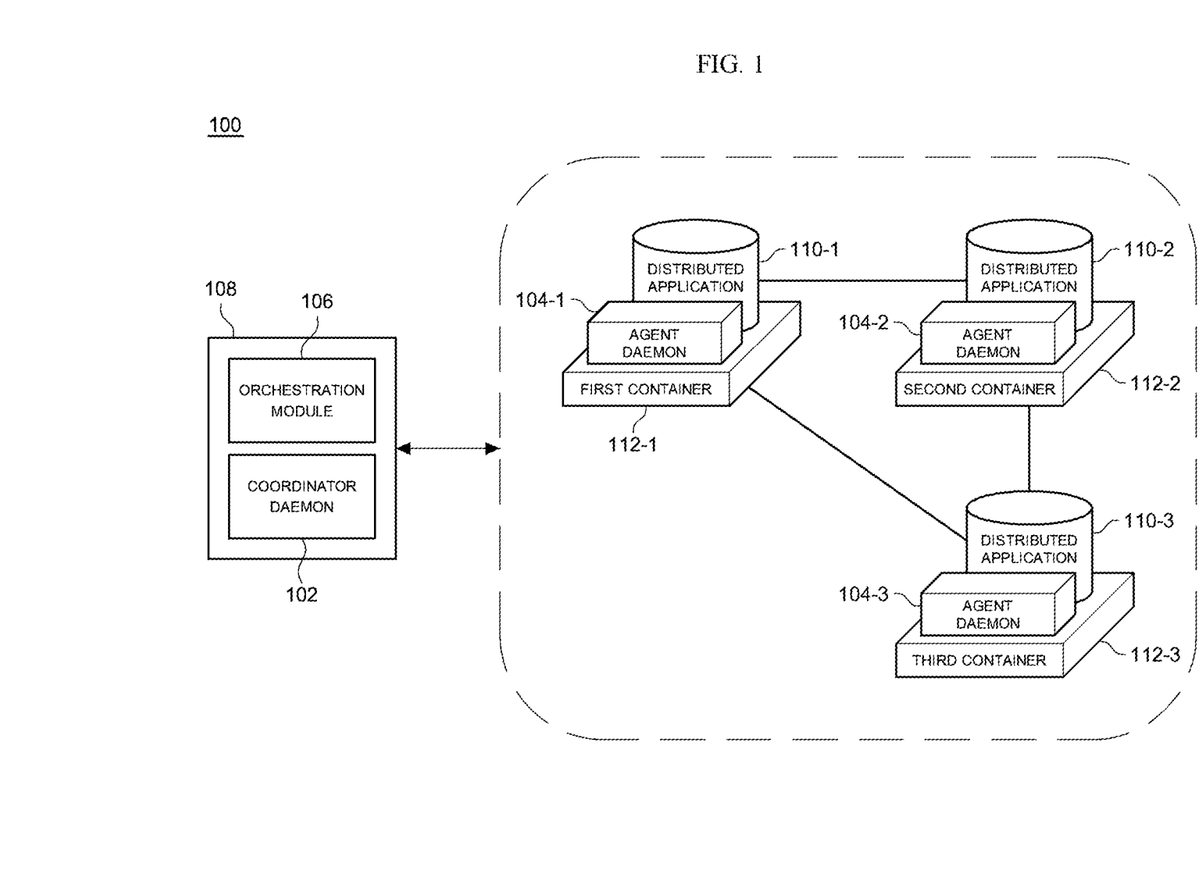
FIG. 1 is a block diagram illustrating a container-based distributed application management system according to an exemplary embodiment of the present disclosure.

FIG. 1 is a block diagram illustrating a container-based distributed application management system 100 according to an exemplary embodiment of the present disclosure. The container-based distributed application management system 100 according to an exemplary embodiment of the present disclosure refers to a system for managing a plurality of distributed applications separately installed in a plurality of containers in a container-based distributed processing environment in which the plurality of distributed applications forming one cluster are separately executed in the plurality of containers.

In the exemplary embodiment shown in the drawing, distributed applications refer to a comprehensive concept encompassing any type of application whose one task is processed by a plurality of nodes in a distributed manner. For example, a distributed database, a distributed storage, and the like may be distributed applications, but exemplary embodiments of the present disclosure are not limited to a specific type of application. Also, in exemplary embodiments of the present disclosure, a plurality of distributed applications are separately run in containers. In exemplary embodiments of the present disclosure, a container refers to a software providing technology for packaging and providing both an application to be executed and subordinates for running the application, for example, a library, a system tool, a runtime environment, and the like. Such a container does not include a kernel of an operating system (OS) and thus is faster and more agile and uses fewer resources than an existing virtual machine. In the following description, each distributed application and a container which runs the distributed application are comprehensively referred to as "distributed node" or "node."

As shown in FIG. 1, the distributed application management system 100 according to an exemplary embodiment of the present disclosure includes a coordinator daemon 102 and a plurality of agent daemons 104-1, 104-2, and 104-3. Although the three agent daemons 104-1, 104-2, and 104-3 are present in the exemplary embodiment shown in the drawing, this is exemplary, and the number of agent daemons may vary according to the number of distributed applications which form a cluster. In the following description, when a common aspect of the agent daemons 104-1, 104-2, and 104-3 is described, an identification number 104 will be used instead of 104-1, 104-2, and 104-3 for convenience of description. This is the same for distributed applications 110-1, 110-2, and 110-3 and containers 112-1, 112-2, and 112-3.

The coordinator daemon 102 is a module which stores and manages cluster setting information corresponding to the cluster. Here, the cluster setting information may include configuration information and identification information of each distributed application forming the cluster. For example, identification information of each distributed application may be a unique identifier (ID) of each distributed application, a network address (an Internet protocol (IP) address or the like) or a name (a unique ID) of a container in which each distributed application is run, or the like.

In an exemplary embodiment, the coordinator daemon 102 may be installed in the same hardware as external hardware 108 in which an orchestration module 106 is installed. In exemplary embodiments of the present disclosure, the orchestration module 106 may be installed in the external hardware 108 distinguished from the plurality of distributed applications 110 and perform scale-in/out and a failover of the plurality of distributed applications 110. In this case, the coordinator daemon 102 may be provided in the same hardware as the orchestration module 106. However, this is exemplary, and the distributed application management system 100 may also include additional hardware for running the coordinator daemon 102 according to an exemplary embodiment.

The plurality of agent daemons 104 are separately installed and executed in the plurality of containers 112 and receive the cluster setting information from the coordinator daemon 102 to initially run the distributed applications 110 installed in the containers 112. As described above, the cluster setting information may include at least one piece of identification information of the plurality of distributed applications 110 included in the cluster. Each of the plurality of agent daemons 104 may be generated when a container 112 corresponding to the agent daemon 104 is newly generated.

Also, each of the agent daemons 104 monitors whether a problem has occurred in at least one of the plurality of distributed applications 110. When the occurrence of a problem is detected, an agent daemon 104 which has detected the occurrence of a problem removes a distributed application 110 in which the occurrence of a problem has been detected from the cluster. Subsequently, the orchestration module 106 generates a new distributed application 110 as a replacement for the removed distributed application 110.

In an exemplary embodiment, the coordinator daemon 102, the agent daemons 104, the orchestration module 106, the distributed applications 110, and the containers 112 may be implemented on a computing device including one or more processors and a computer-readable recording medium connected to the processors. The computer-readable recording medium may be inside or outside the processors and connected to the processors by various well-known means. The processors inside the computing device may allow each computing device to operate according to an exemplary embodiment described herein. For example, the processors may execute instructions stored in the computer-readable recording medium, and the instructions stored in the computer-readable recording medium may be configured to cause the computing device to perform operations according to exemplary embodiments described herein when executed by the processors. In an exemplary embodiment, the one or more processors may be central processing units (CPUs).

Figure 2:
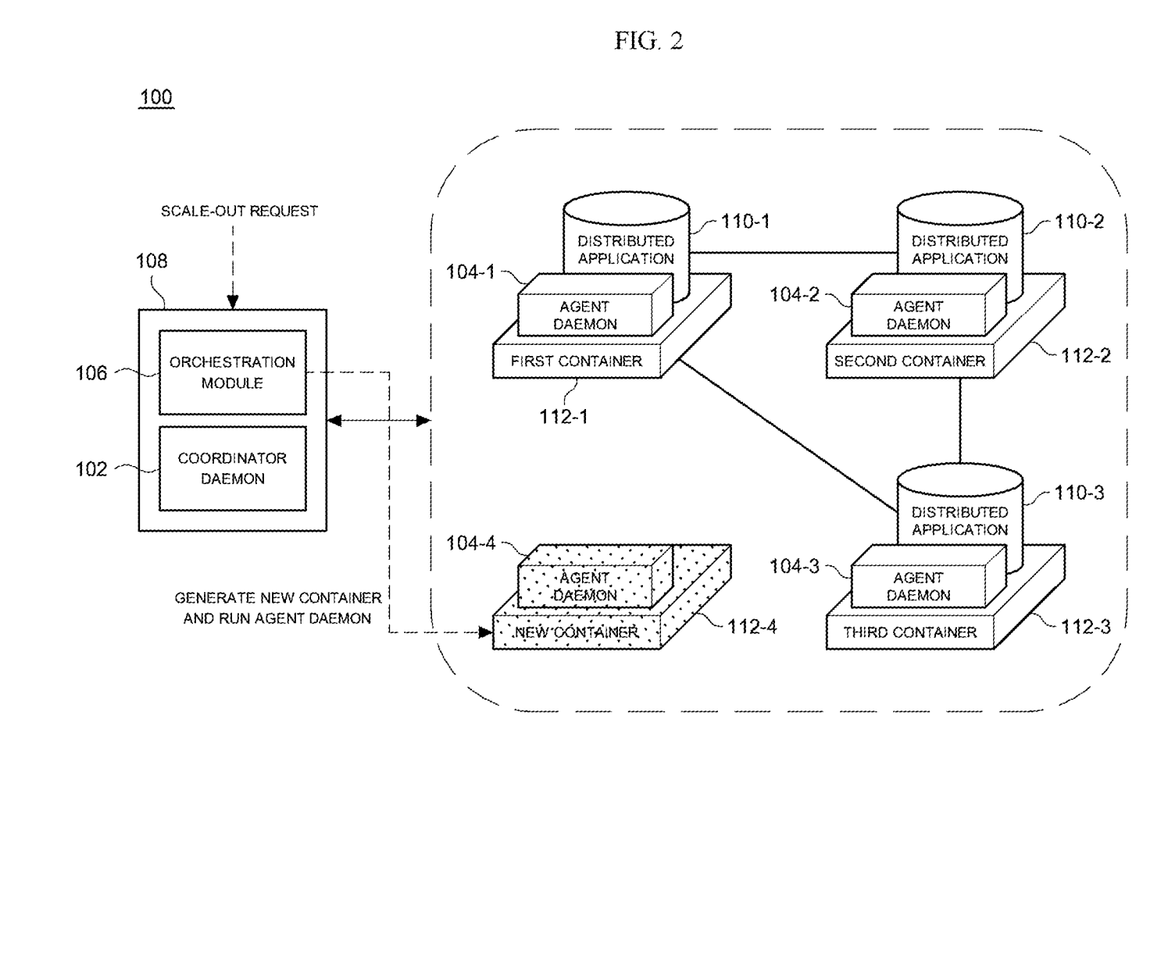
FIGS. 2 and 3 are block diagrams illustrating a scale-out process in a container-based distributed application management system according to an exemplary embodiment of the present disclosure.
Figure 3:
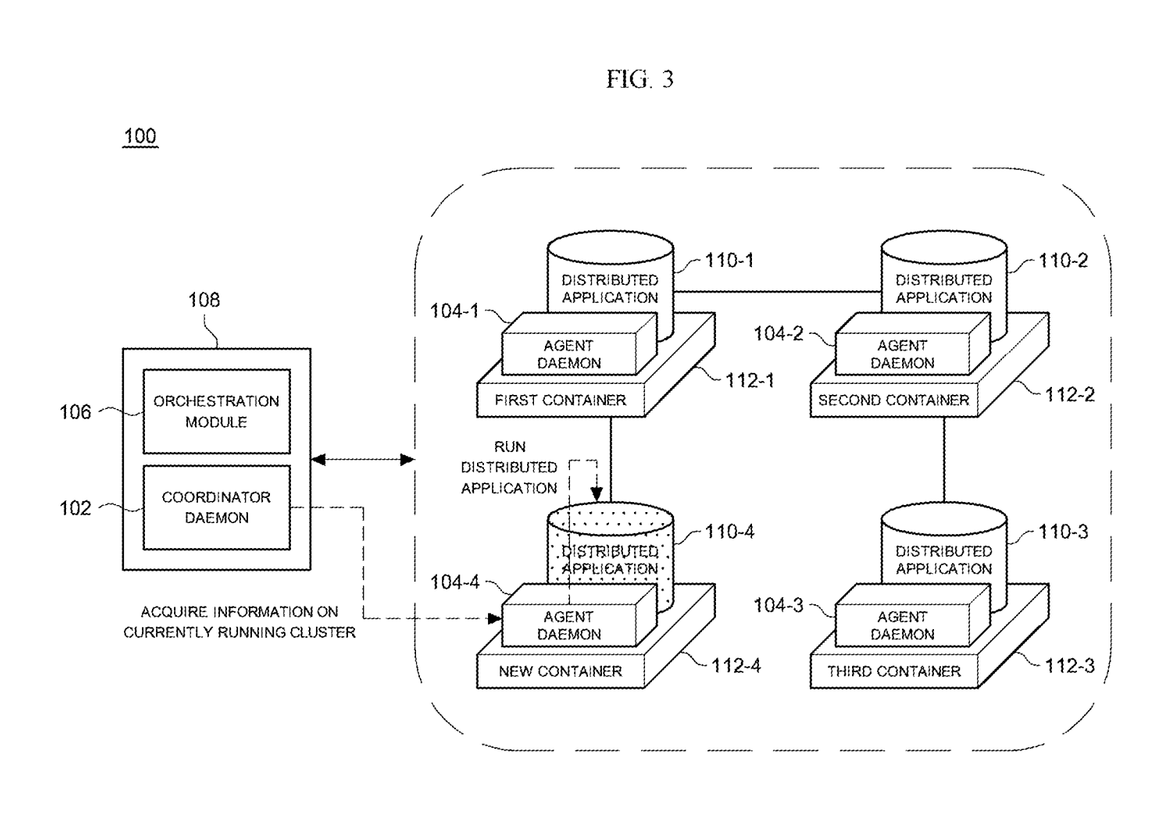

FIGS. 2 and 3 are block diagrams illustrating a scale-out process in the container-based distributed application management system 100 according to an exemplary embodiment of the present disclosure. In exemplary embodiments of the present disclosure, scale-out is the opposite concept of scale-in and refers to adding a new distributed application to a cluster.

First, an administrator or the like of the cluster transmits a scale-out request to the cluster through the orchestration module 106. Then, the orchestration module 106 generates a new container 112-4 in the cluster and runs an agent daemon 104-4 in the generated container 112-4. In other words, in exemplary embodiments of the present disclosure, an agent daemon 104 installed in each container 112 is generated when a container 112 corresponding to the agent daemon 104 is generated.

Subsequently, the newly generated agent daemon 104-4 transmits a cluster setting information request to the coordinator daemon 102, and the coordinator daemon 102 returns cluster setting information to the agent daemon 104-4 in response to the request. In an exemplary embodiment, the cluster setting information may include at least one piece of the identification information of the plurality of distributed applications 110 included in the cluster. For example, the cluster setting information may include access information (an IP address and the like) of any one of the plurality of distributed applications 110 included in the cluster.

The agent daemon 104-4 which receives the cluster setting information runs a new distributed application 110-4 in the newly generated container 112-4 on the basis of the received cluster setting information. In this case, the newly run distributed application 110-4 may access (communication exchange) at least one of the other distributed applications 110 included in the cluster using the cluster setting information to join the cluster. In other words, according to exemplary embodiments of the present disclosure, when a new distributed application is generated in a container-based distributed environment, the new distributed application is able to join an existing cluster without an additional setting of an administrator.

Figure 4:
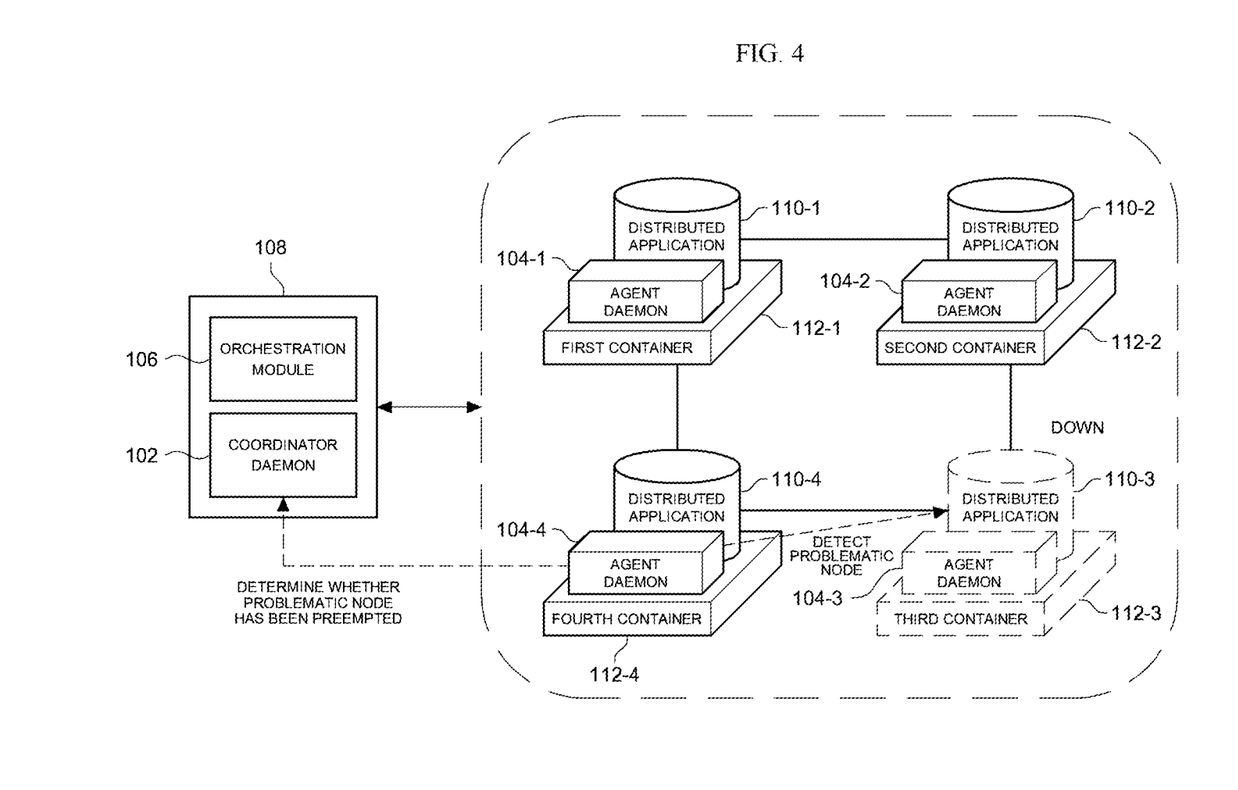
FIGS. 4 and 5 are block diagrams illustrating a failover process in a container-based distributed application management system according to an exemplary embodiment of the present disclosure.
Figure 5:
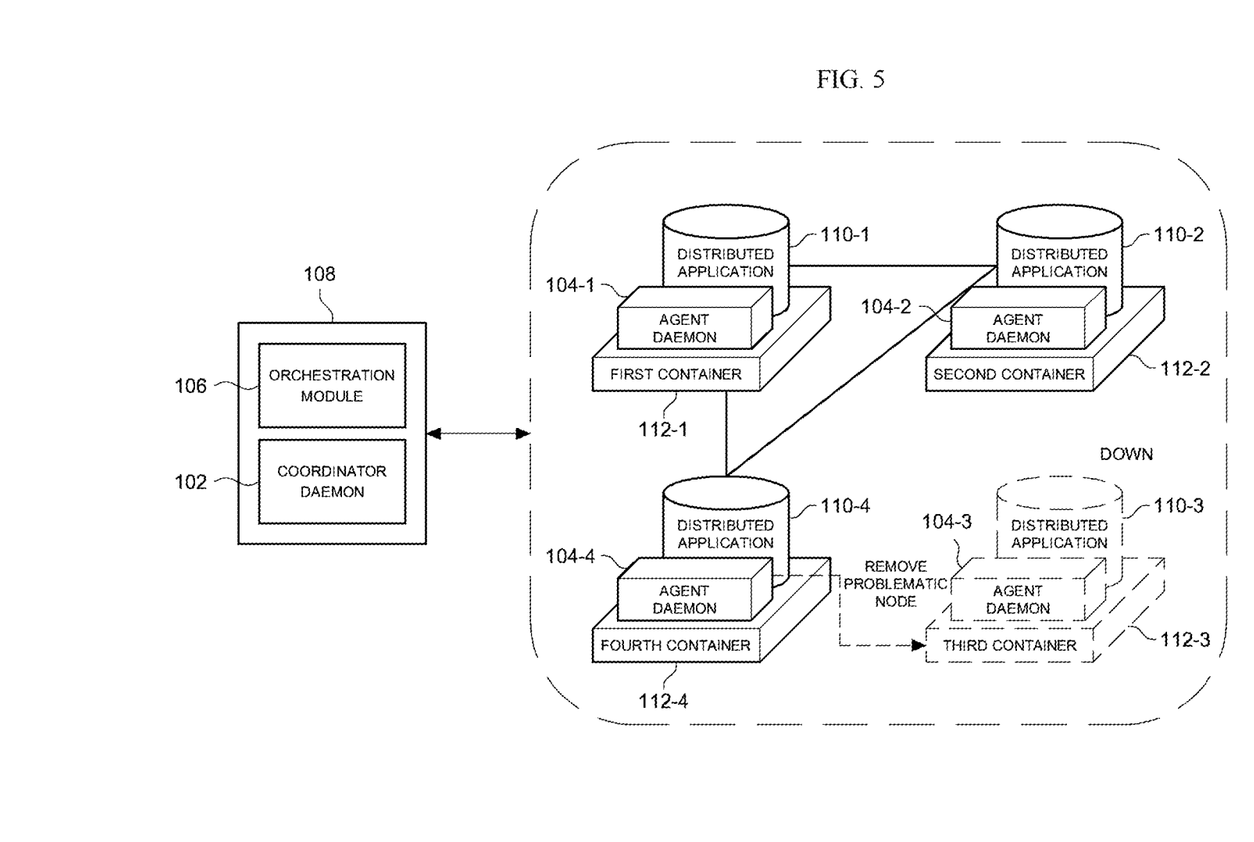

FIGS. 4 and 5 are block diagrams illustrating a failover process in the container-based distributed application management system 100 according to an exemplary embodiment of the present disclosure. In exemplary embodiments of the present disclosure, a failover process of the container-based distributed application management system 100 refers to removing a distributed application in which a failure has occurred from a cluster and generating a new distributed application as a replacement for the removed distributed application. The exemplary embodiment shown in the drawings is an example in which the agent daemon 104-4 installed in the fourth container 112-4 detects a problem occurring in the distributed application 110-3 installed in the third container 112-3.

First, each of the agent daemons 104 included in the cluster periodically checks states of the distributed applications 110 included in the cluster. For example, each of the agent daemons 104 may check a state of each of the distributed applications using a method such as polling or the like.

Here, when the agent daemon 104-4 installed in the fourth container 112-4 detects the problem of the distributed application 110-3, the agent daemon 104-4 queries the coordinator daemon 102 about whether the distributed application 110-3 in which the problem has occurred (referred to as "problematic node" below) has been preempted (i.e., whether another agent daemon has detected the problem of the problematic node earlier). The coordinator daemon 102 which receives the query determines whether a query about preemption of the problematic node has been previously received from another distributed application 110. When it is determined that the same query has not been received, the coordinator daemon 102 determines that the problematic node has not been preempted and returns the determination result to the agent daemon 104-4.

In exemplary embodiments of the present disclosure, each of the agent daemons 104 periodically checks a state of each of the distributed applications 110, and thus two or more agent daemons 104 may detect a failure of a specific distributed application 110. Here, in exemplary embodiments of the present disclosure, it is possible to prevent a plurality of agent daemons 104 from attempting to remove a problematic node by pre-querying the coordinator daemon 102 about whether the corresponding problematic node has been preempted by another agent daemon 104 in advance of processing the problematic node.

When a result of the query indicates that the problematic node has not been preempted, the agent daemon 104-4 removes the problematic node from the cluster. Specifically, the agent daemon 104-4 provides information of the problematic node to the other distributed applications 110 in the cluster so that the distributed applications 110 may reassign tasks excluding the problematic node.

Subsequently, the orchestration module 106 newly generates a new distributed application as a replacement for the problematic node. Since the generation process is the same as described above with reference to FIGS. 2 and 3, the description will not be reiterated here.

Figure 6:
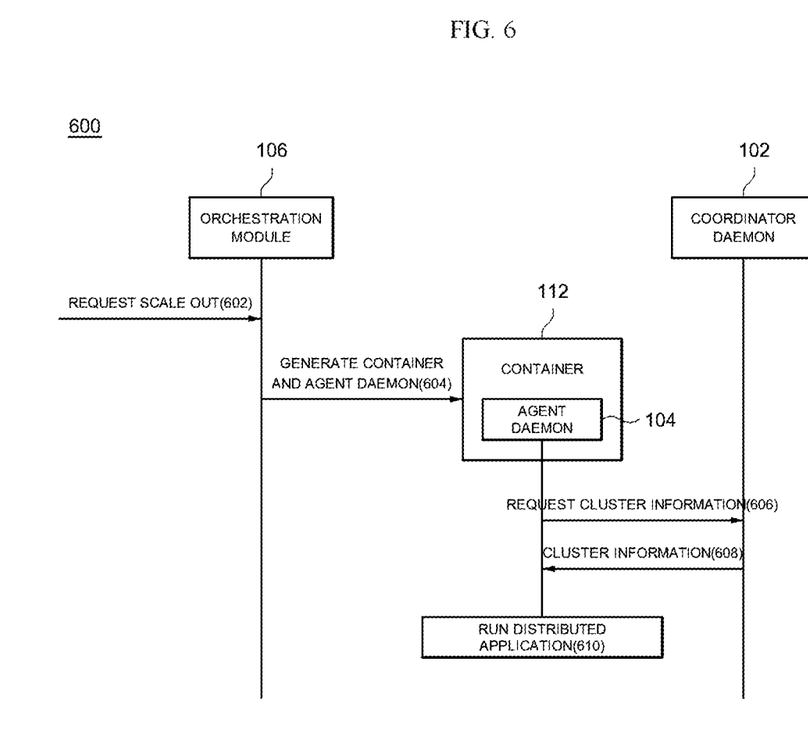
FIG. 6 is a sequence diagram illustrating a scale-out process in a container-based distributed application management system according to an exemplary embodiment of the present disclosure.

FIG. 6 is a sequence diagram illustrating a scale-out process in the container-based distributed application management system 100 according to an exemplary embodiment of the present disclosure. Although the sequence diagram illustrates the process divided into a plurality of operations, at least some operations may be performed in a different order, performed in combination with each other, omitted, or performed in sub-operations, or at least one operation not shown in the drawing may be added and performed.

In operation 602, the orchestration module 106 receives a scale-out request from an administrator or the like.

In operation 604, the orchestration module 106 generates a new container 112 in a cluster and runs a new agent daemon 104 in the generated container 112.

In operation 606, the newly generated agent daemon 104 requests cluster setting information from the coordinator daemon 102.

In operation 608, the coordinator daemon 102 returns cluster setting information to the agent daemon 104. As mentioned above, the cluster setting information may include at least one piece of identification information of a plurality of distributed applications 110 included in the cluster. For example, the cluster setting information may include access information (an IP address and the like) of any one of the plurality of distributed applications 110 included in the cluster.

In operation 610, the agent daemon 104 runs a new distributed application 110 in the newly generated container 112 using the received cluster setting information.

Figure 7:
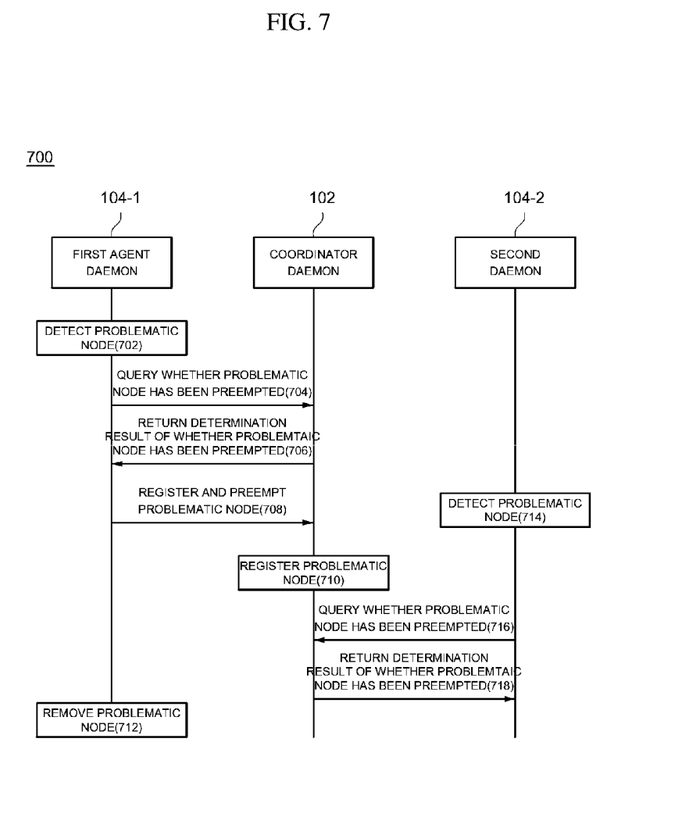
FIG. 7 is a sequence diagram illustrating a failover method in a container-based distributed application management system according to an exemplary embodiment of the present disclosure.

FIG. 7 is a sequence diagram illustrating a failover method in the container-based distributed application management system 100 according to an exemplary embodiment of the present disclosure. Although the sequence diagram shown in the drawing illustrates the process divided into a plurality of operations, at least some operations may be performed in a different order, performed in combination with each other, omitted, or performed in sub-operations, or at least one operation not shown in the drawing may be added and performed. The sequence diagram shows an example in which the agent daemon 104-1 and the agent daemon 104-2 separately detect the occurrence of a problem in the cluster.

In operation 702, the agent daemon 104-1 detects the occurrence of a distributed application in which a problem has occurred (a problematic node) by monitoring whether a problem has occurred in at least one of the plurality of distributed applications 110 in the cluster.

In operation 704, the agent daemon 104-1 queries the coordinator daemon 102 about whether the problematic node has been preempted.

In operation 706, the coordinator daemon 102 which receives the query returns a determination result of whether the problematic node has been preempted. Specifically, the coordinator daemon 102 determines that the detected problematic node has been preempted when a query about whether the problematic node has been preempted has been received from another agent daemon before the query about whether the problematic node has been preempted is received from the agent daemon 104-1, and determines that the detected problematic node has not been preempted when the query has not been received from another agent.

In operation 708, the agent daemon 104-1 registers and preempts the problematic node which has not been preempted yet. Then, in operation 710, the coordinator daemon 102 registers the corresponding node as a problematic node.

Subsequently, the agent daemon 104-1 removes the registered problematic node.

Meanwhile, the agent daemon 104-2 which detects the problem in the same node separately from the agent daemon 104-1 also queries the coordinator daemon 102 about whether the problematic node has been preempted (716). In this case, the coordinator daemon 102 which receives the query determines that the problematic node has been preempted and returns information indicating that the problematic node has been preempted to the agent daemon 104-2, and the agent daemon 104-2 which receives the information stops additional tasks.

Figure 8:
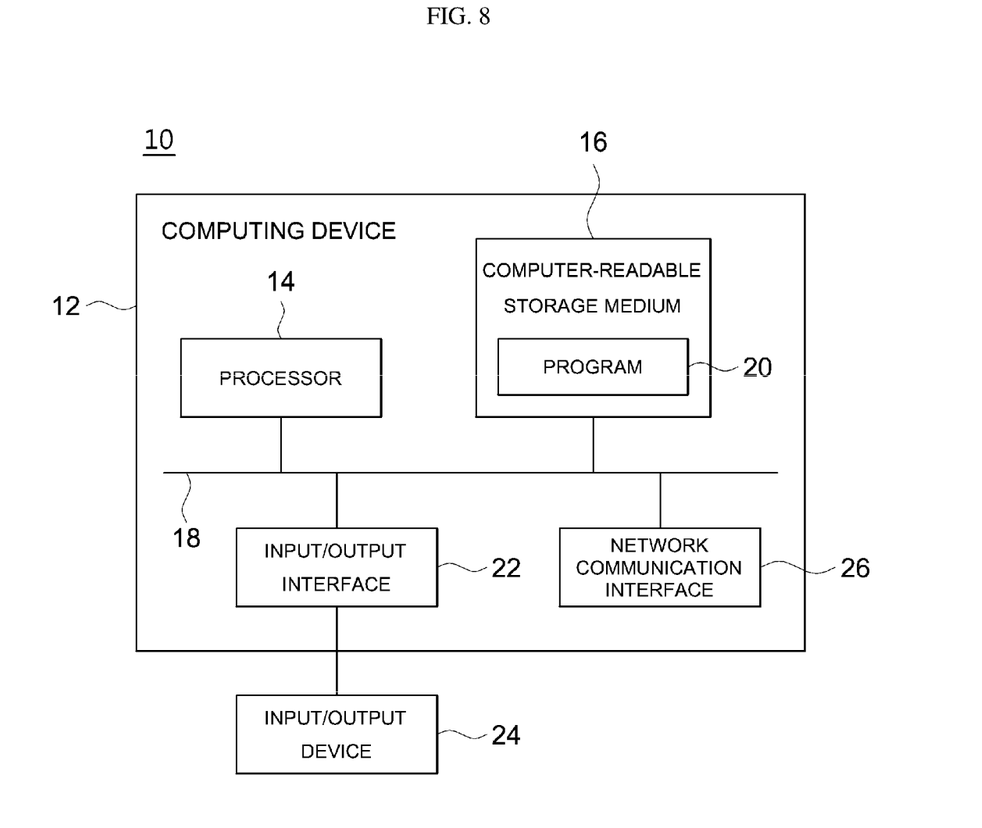
FIG. 8 is a block diagram illustrating a computing environment including a computing device appropriate for use in exemplary embodiments.

FIG. 8 is a block diagram illustrating a computing environment 10 including a computing device appropriate for use in the exemplary embodiments. In the exemplary embodiment shown in the drawing, each of the components may have a function and a capability other than those described below, and an additional component other than the components described below may be included.

The computing environment 10 shown in the drawing includes a computing device 12. In an exemplary embodiment, the computing device 12 may be a device for running each of the containers 112 or a device for running the coordinator module 102 and the orchestration module 106 in the container-based distributed application management system 100 according to an exemplary embodiment of the present disclosure.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause the computing device 12 to perform operations according to an exemplary embodiment when executed by the processor 14.

The computer-readable storage medium 16 is configured to store computer-executable instructions or program code, program data, and/or information in other appropriate forms. A program 20 stored in the computer-readable storage medium 16 includes a set of instructions executable by the processor 14. In an exemplary embodiment, the computer-readable storage medium 16 may be a memory (a volatile memory such as a random access memory (RAM), a non-volatile memory, or an appropriate combination thereof), one or more magnetic disk storage devices, optical disk storage devices, flash memory devices, another form of storage medium which is accessible by the computing device 12 and capable of storing desired information, or an appropriate combination thereof.

The communication bus 18 connects various other components of the computing device 12 including the processor 14 and the computer-readable storage medium 16 to each other.

The computing device 12 may also include one or more input/output interfaces 22 for one or more input/output devices 24 and one or more network communication interfaces 26. The input/output interfaces 22 and the network communication interfaces 26 are connected to the communication bus 18. The input/output devices 24 may be connected to other components of the computing device 12 via the input/output interfaces 22. Examples of the input/output devices 24 may include input devices, such as a pointing device (a mouse, a trackpad, and the like), a voice or sound input device, various types of sensor devices, and/or a photographing device, and/or output devices, such as a display device, a printer, a speaker, and/or a network card. Examples of the input/output devices 24 may be included in the computing device 12 as components constituting the computing device 12, or may be connected to the computing device 12 as separate devices distinguished from the computing device 12.

Meanwhile, exemplary embodiments of the present disclosure may include a program for performing the methods described herein in a computer and a computer-readable recording medium including the program. The computer-readable recording medium may include program instructions, local data files, and local data structures solely or in combination. The medium may be specially designed and configured for the present disclosure or well-known and available to those of ordinary skill in the computer software field. Examples of the computer-readable recording medium include magnetic media, such as a hard disk, a floppy disk, and a magnetic tape, optical recording media, such as a compact disc read-only memory (CD-ROM) and a digital versatile disc (DVD), and hardware devices, such as a ROM, a RAM, a flash memory, and the like, specially configured to store and execute program instructions. Examples of the program may include high-level language code executable by a computer using an interpreter or the like as well as machine language code generated by a compiler.

According to exemplary embodiments of the present disclosure, even when a distributed application is scaled out or failovers of some distributed applications occur in a container-based distributed processing environment, it is possible to dynamically apply changes to a cluster.

Although exemplary embodiments of the present disclosure have been described in detail above, those of ordinary skill in the art to which the present disclosure pertains will appreciate that various modifications may be made without departing from the scope of the present disclosure. Therefore, the scope of the present disclosure is to be determined by the following claims and their equivalents, and is not restricted or limited by the foregoing detailed description.

What is claimed is:

1. A container-based distributed application management system, comprising:
    a coordinator daemon configured to store and manage cluster setting information corresponding to a cluster formed by a plurality of distributed applications, the plurality of distributed applications configured to be separately executed in a plurality of containers; and
    a plurality of agent daemons configured to be separately installed and executed in the plurality of containers, and receive the cluster setting information from the coordinator daemon to execute at least one of the plurality of distributed applications installed in the plurality of containers,
    wherein the coordinator daemon and the plurality of agent daemons are implemented by using one or more hardware processors.

2. The container-based distributed application management system of claim 1, wherein the cluster setting information comprises identification information of the at least one of the plurality of distributed applications included in the cluster.

3. The container-based distributed application management system of claim 1, wherein an agent daemon among the plurality of agent daemons is generated when a container corresponding to the agent daemon is newly generated.

4. The container-based distributed application management system of claim 1, wherein the plurality of agent daemons monitor whether a problem occurs in the at least one of the plurality of distributed applications and remove a distributed application in which an occurrence of the problem is detected from the cluster.

5. The container-based distributed application management system of claim 4, wherein the plurality of agent daemons query the coordinator daemon about whether the distributed application in which the occurrence of the problem is detected has been preempted and remove the distributed application from the cluster in response to a result of querying the coordinator daemon indicating that the distributed application has not been preempted.

6. The container-based distributed application management system of claim 5, wherein the coordinator daemon determines that the distributed application in which the occurrence of the problem has been detected has been preempted when a query about whether the distributed application has been preempted has been previously received from one of the plurality of agent daemons.

7. A container-based distributed application management method, comprising:
    transmitting, by an agent daemon installed and executed in a newly generated container, a request for cluster setting information to a coordinator daemon;
    providing, by the coordinator daemon, the cluster setting information corresponding to a cluster formed by a plurality of distributed applications to the agent daemon, the plurality of distributed applications configured to be separately executed in a plurality of containers; and
    executing, by the agent daemon, a distributed application in the newly generated container based on the cluster setting information,
    wherein the agent daemon and the coordinator daemon are implemented by using one or more hardware processors.

8. The container-based distributed application management method of claim 7, wherein the cluster setting information comprises identification information of at least one of the plurality of distributed applications included in the cluster.

9. A container-based distributed application management method, comprising:
    monitoring, by a plurality of agent daemons separately installed and executed in a plurality of containers, whether a problem occurs in at least one of a plurality of distributed applications that form a cluster, the plurality of distributed applications configured to be separately executed in the plurality of containers;
    querying, by an agent daemon that detects an occurrence of the problem in a distributed application among the plurality of distributed applications, a coordinator daemon about whether the distributed application in which the occurrence of the problem is detected has been preempted; and
    removing the distributed application from the cluster in response to a result of the querying indicating that the distributed application has not been preempted,
    wherein the plurality of agent daemons and the coordinator daemon are implemented by using one or more hardware processors.

10. The container-based distributed application management method of claim 9, further comprising determining, by the coordinator daemon, that the distributed application in which the occurrence of the problem is detected has been preempted when a query about whether the distributed application has been preempted has been previously received from one of the plurality of agent daemons.

* * * * *